United States Patent [19]

Sachar

[11] 4,088,991
[45] May 9, 1978

[54] VISUAL DISPLAY BY ELECTRIC CONTROL OF SCATTERING OF LIGHT FROM A BEAM GUIDED BY AN ELASTOMER FILM

[75] Inventor: Kenneth Selig Sachar, White Plains, N.Y.

[73] Assignee: International Business Machines Corporation, Armonk, N.Y.

[21] Appl. No.: 701,372

[22] Filed: Jun. 30, 1976

[51] Int. Cl.$^2$ ............................................. G06K 15/18
[52] U.S. Cl. ............................... 340/324 M; 340/373; 340/378 B; 350/360
[58] Field of Search ....... 340/324 M, 166 EL, 378 R, 340/378 B, 373; 350/161 R, 161 S, 161 W, 161 P

[56] References Cited

U.S. PATENT DOCUMENTS

| | | | |
|---|---|---|---|
| 3,655,261 | 4/1972 | Chang ............................. | 350/161 W |
| 3,907,407 | 9/1975 | Vilkomerson et al. .......... | 350/161 S |

*Primary Examiner*—David L. Trafton
*Attorney, Agent, or Firm*—Philip Young

[57] ABSTRACT

A visual display panel wherein a beam of light is internally reflected within an elastomer film and guided across the panel, and an electric field is applied at selected areas of the elastomer film by applying a voltage between at least one pair of upper and lower conducting lines deposited in parallel rows on opposite sides of the elastomer film causing deformation of the elastomer film at the cross-over regions of the upper and lower lines and diversion of the light. More particularly, a source of light is provided at the edge of the elastomer film and directs the light into the elastomer film at an angle which permits complete internal reflection across the elastomer film, except at the locations where the film is deformed. The upper set of parallel conducting lines extend in a direction perpendicular to the direction of the lower set of parallel conducting lines on the other side of the elastomer film. The elastomer film is elastic, transparent and electrically insulating and may be several mils thick. The edge-lighted panel provides an inexpensive, low power, compact display with matrix addressable electrodes.

18 Claims, 5 Drawing Figures

VISUAL DISPLAY BY ELECTRIC CONTROL OF SCATTERING OF LIGHT FROM A BEAM GUIDED BY AN ELASTOMER FILM

BACKGROUND OF THE INVENTION

1. Field of the Invention

The present invention relates to digitally addressable display panels and more particularly to deformable elastomer display panels.

2. Description of the Prior Art

There currently exists a need for a flat display panel which is relatively both simple and inexpensive to manufacture, sturdy, consumes little power, and is capable of multi-color operation. While several types of display panels, such as gas discharge, electrochromic, and liquid crystal are available, each type of panel is disadvantageous in one of the above-noted areas. For example, the gas panel requires a relatively large electric power for operation and, consequently, the metallization used for the conducting lines must be relatively thick in order to prevent a large voltage drop along the lines. In addition, the gas panel requires a relatively complex fabrication operation.

A flat display panel of the light modulator type is disclosed in U.S. Pat. No. 3,796,480 to Preston, Jr., et al., wherein the light modulator includes a rigid glass plate having an array of holes arranged in rows and columns. A plurality of spaced apart, reflective and conductive strips is stretched across the glass plate, and a separate electrode is located underneath each column of holes. Electric signals applied to the strips and electrodes produce electrostatic deflections in the portions of the membrane above the holes. The deflection over any one hole is dependent on the signal applied to the strip above the hole and the signal applied to the electrode below the hole. In operation, the deflections occur at the portions of the membrane and reflective strips extending over the hole, and thereby phase modulate portions of a beam of light reflected from the portions of the reflective strips above the holes.

SUMMARY OF THE INVENTION

It is an object of the present invention to provide a deformable membrane display panel which is simple to fabricate. It is another object to provide a deformographic membrane display panel which is simple in structure and operates with edge illumination.

These and other objects are achieved by the present invention which provides an edge-lighted visual display panel of the digitally addressed type, comprising a substrate of an electrically insulating material, such as glass, having a generally flat upper surface, with a plurality of lower, parallel conducting lines deposited on the upper surface in spaced apart relation. A transparent, electrically insulating and deformable film of elastomer material is deposited on top of the lower conducting lines and the substrate. A plurality of upper, parallel conducting lines is deposited on the upper surface of the deformable elastomer film with such upper conducting lines extending in a direction substantially perpendicular to the lower conducting lines. A source of light is provided at the edge of the elastomer film and directs the light into the elastomer film at angles which permit complete internal reflection across the elastomer film, except at the locations where the film is deformed. A voltage difference is applied across selected pairs of the upper and lower conducting lines to produce a deformation of the elastomer film at the locations where the excited upper and lower lines cross over one another. The light being reflected in the elastomer film is scattered at the location of the deformation and detected by an observer of the panel.

DESCRIPTION OF THE PREFERRED EMBODIMENTS

Figure 1:
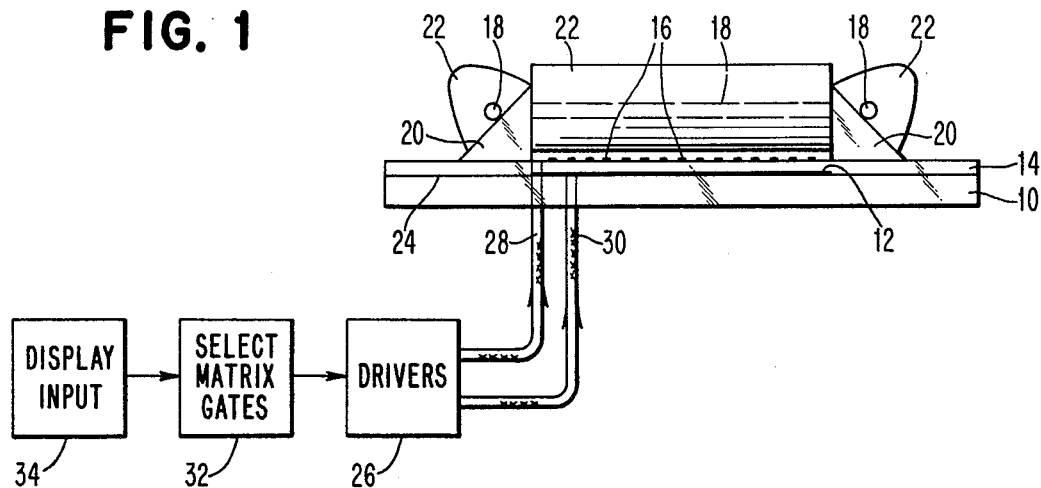
FIG. 1 is a diagrammatic view of the display device of the present invention including a side view of the panel.
Figure 2:
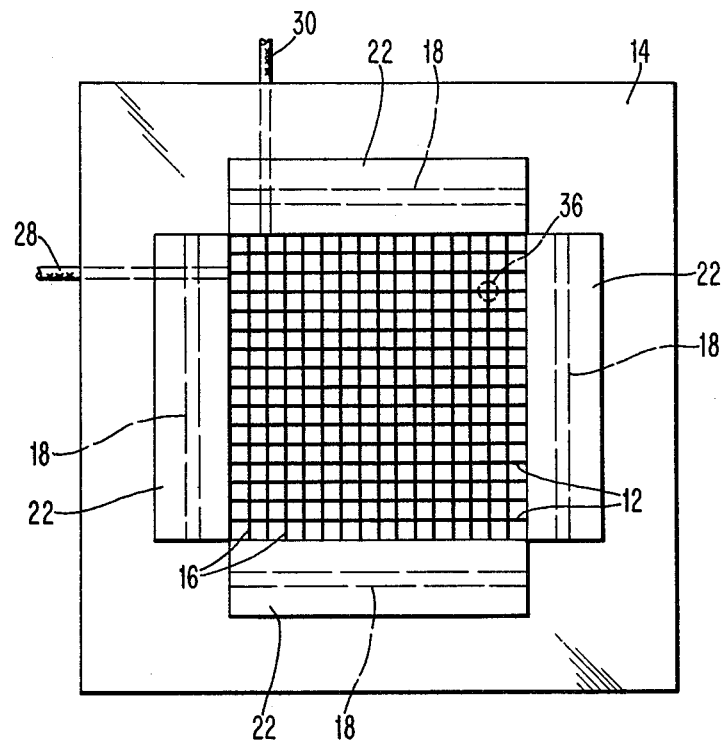
FIG. 2 is a top view of the display panel shown in FIG. 1.

Referring to FIGS. 1 and 2, there is shown the flat display device of the present invention which includes an insulating substrate 10 having an array of lower, parallel conducting lines 12 deposited thereon by conventional processes, such as evaporation or sputtering. The upper surface of the substrate 10 is coated with a thin, transparent, elastic film 14 having a refractive index which is greater than that of the underlying substrate 10. The relatively low refractive index substrate 10 may be comprised of glass while the elastomer film 14 may comprise a deformable silicone material having a thickness in the order of about 1 to 20 mils. An upper array of parallel conducting lines 16 is evaporated or sputtered onto the elastomer film 14 with the upper lines 16 running generally perpendicular to the lower lines 12 so as to provide a matrix of cross-over points of the upper and lower lines covering substantially the entire panel display. One or more light sources 18 and prisms 20 are mounted along the edges of the elastomer film 14 to provide light which is coupled into the film from the edges thereof. The light source 18 has around it a parabolic reflector 22 such that the light is injected into the diagonal of the prism 20 and reflected from the lower surface of the prism 20 at angles which provide both efficient coupling of the light from the prism into the film 14 and internal reflection across such film. The lower surface of the elastomer film 14 is indicated by numeral 24.

Figure 4:
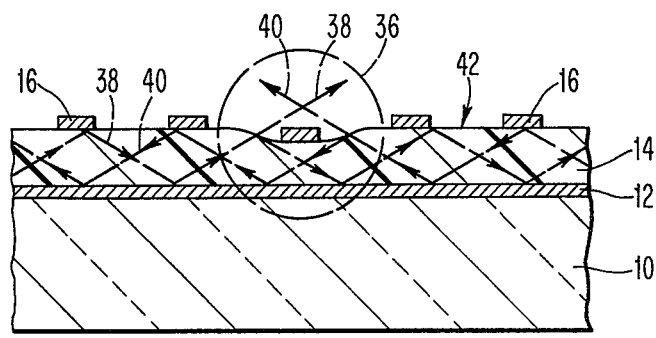
FIG. 4 is a view similar to FIG. 3 wherein the elastomer is deformed to permit the internally reflected light to escape from the elastomer in the area of the deformation.

The upper and lower conducting lines 16 and 12 are respectively connected to conventional driver circuits 26, as illustrated by the cables 28 and 30, respectively. Drivers 26 provide the power for producing the electric field which is sufficient to deform the elastomer membrane 14. Select matrix gates 32 enable the appropriate drivers 26 to be energized for providing a voltage potential across selected pairs of the upper and lower conducting lines 16 and 12. The select matrix gates simply consist of an array of AND gates which are enabled in accordance with the output signals provided by a display input 34. In operation, a request for a particular display is transformed by conventional means in the display unit 34 into selected combinations of inputs for the upper and lower conducting lines 16 and 12. The select matrix gates 32 receive these inputs and enable the appropriate drivers 26. At the cross-over point where an upper conducting line 16 and a lower conducting line 12 are both provided with a voltage difference therebetween, such as is indicated by the dotted circle 36 in FIGS. 2 and 4, an electrical force is created at that location which attempts to pull the upper and lower conducting lines together. This force results in a deformation of the elastomer film which is largest in the vicinity of the cross-over point as indicated in FIG. 4 by the circled area 36. As shown in FIG. 4, the light propagating through the film, indicated by the arrows 38 and 40, is scattered in the area 36 and detected by an observer of the display panel.

Figure 3:
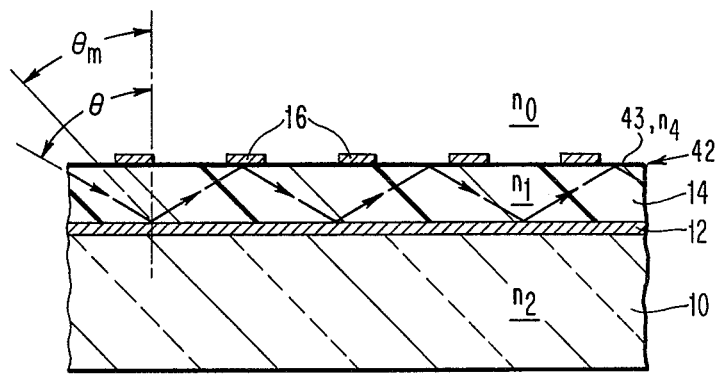
FIG. 3 is a close-up view of a section of the display panel indicating the upper and lower conducting lines in their inactivated state.

FIG. 3 shows the light beams 38 and 40 propagating across the elastomer film 14 in an area where no deformation of the film has occurred, in which case the beams 38 and 40 are internally reflected across the elastomer film 14 without any light being scattered outside of the panel. In this case, the top area of the panel shown in FIG. 3 will appear dark to the viewer since no voltages are applied across upper and lower conductors which intersect.

Well known light principles provide that where a beam of light is incident upon the interface between two dielectric materials of differing refractive indices, $n_1$ and $n_2$, then, depending upon the relative magnitudes of the indices, the angle of incidence, and the polarization of the light, the beam may be reflected, transmitted, or a combination of the two. If $n_1 > n_2$, there exists an angle, $\theta_m = \sin^{-1}(n_2/n_1)$, beyond which complete reflection occurs where the light is transmitted in the first material ($n_1$). This angle $\theta$ is formed between the light beam and the normal line extending perpendicular to the plane of the surface between the two materials. If the high index region is bounded above and below by lower index regions, then radiation can be confined to the middle if its angle of incidence, $\theta$, is greater than $\theta_m$. In the example shown in FIG. 3, the elastomer film 14 represents the material having the refractive index $n_1$, the substrate 10 has the refractive index $n_2$ and the air or any other tranparent, insulating layer adjacent to the top surface 42 of film 14 has a refractive index of $n_0$. Thus, the relatively high index region $n_1$ is bounded above and below by lower index regions $n_0$ and $n_2$.

Actually, because the electric field must satisfy boundary conditions at the upper and lower interfaces of the elastomer film 14, the light is permitted to propagate at only discrete angles. If the thickness of the middle region $n_1$ is much larger than the wavelength of the light, the discreteness is not evident, since the allowed angles are so close together. This is not true when the thickness of middle region $n_1$ is on the same order as the wavelength of the light. Even when the light is confined to the middle region, $n_1$, the electric field extends into the upper and lower regions, $n_0$ and $n_2$. The amplitudes, however, decrease exponentially with distance in a direction perpendicular to the interface of the regions. If a region of high refractive index $n_3$ (where $n_3 > n_1 > n_0$) is placed above the film and separated by a thin region having a refractive index $n_0$ and a thickness which is less than a wavelength of the light radiation, then power may be efficiently transferred between the two. This is the basis for the prism coupler 20 shown in greater detail in FIG. 5. Here, this thin region $n_0$ is indicated by numeral 44 in FIG. 5 and can be simply the natural air gap resulting from the mountig of the prism 20 onto the top surface 42 of the elastomer film 14. This air gap 44 is represented by the refractive index $n_0$ while the prism 20 has the refractive index $n_3$. Alternately, a thin film of material having a low refractory index in the order of air can be placed between the lower surface 46 of prism 20 and the top surface 42 of elastomer film 14.

Figure 5:
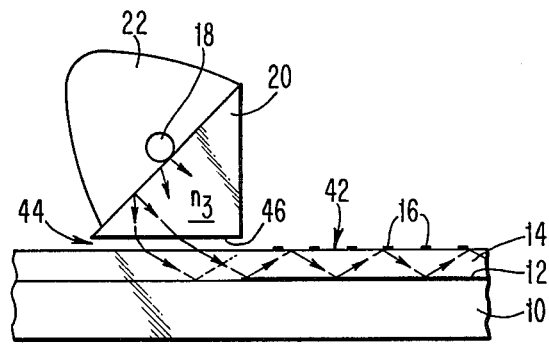
FIG. 5 shows one source of edge illumination for the display panel.

Referring to FIG. 5, light is injected into the diagonal of the prism 20 and allowed to be reflected from the lower surface 46. The angle at which light strikes the lower surface 48 of the prism 20 determines whether the light is coupled into the elastomer film 14 for a range of angles so that there is complete internal reflection. If the light beam is nondivergent, as when a laser is used as the light source, power can be selectively injected at a single angle or a very narrow range of angles.

It has been found that the light being guided through the elastomer film 14 can be broken into component modes or a range of angle values which are permitted to pass the light across the film. As the thickness of the elastomer film 14 decreases, the number of guided modes, or the range of angular values, permitted also decreases.

As described above in connection with FIG. 3, the upper surface 42 of the elastomer film 14 can have deposited thereon, between such surface and the metal conducting lines 16, a buffer film having a refractive index $n_4$ which is lower than that of the elastomer film 14. The use of this transparent outer buffer film indicated by line 43 can be used in cases where it is desirable to minimize the intensity of the light impinging upon the metal conducting lines 16 as well as minimizing the scattering of light from the edge of the metallization.

The elastomer film material 14 may be the commercially available Emerson and Cuming 2CN, Eccogel 1265 or Dow-Corning XR-63-493. It has been found desirable to provide a film thickness in the order of 1 to 20 mils, there being a minimum film thickness required to produce a deformation of the elastomer film 14 to provide sufficient scattering of the light which is visible. In addition, this minimum film thickness is partially determined by the width of the conducting lines 16 so that a sufficiently large area is distorted adjacent to the conducting line which is causing the deformation of the film. A typical conducting line width of about 4 mils and 500 angstroms thick can be used where the elastomer film has a thickness of about 6 mils. It is to be understood that the conducting lines 12 and 16 can be substituted by an array of disk-like electrodes which are spaced apart and located on both sides of the elastomer film 14 such that the application of a voltage potential across oppositely positioned electrodes will create a field therebetween to deform the elastomer film.

One method of fabricating the display panel comprises employing a Pyrex glass disk which is ground and polished, having a refractive index of 1.47. A silver film, 2,000 angstroms thick and 4 mils wide, is evaporated onto the disk substrate and forms the lower conducting lines 12. Next, the elastomer film 14 is spun at 1,000 rpm for one minute onto the substrate 10 and deposited approximately 6 mils thick, and then cured at an elevated temperature. This is accomplished by exposing the elastomer film to a d.c. discharge of 1,000 volts at 0.05 Torr for 30 seconds to permit evaporation upon its upper surface. Upper conducting lines 500 Angstroms thick are then deposited upon the cured elastomer film through a mask. Electrical contact to the upper and lower conducting lines is made with a conducting epoxy. The right angle prism 20 is placed upon the film 14 and adhered thereto. The thin film of air trapped between the lower surface 44 of the prism 20 and the upper surface 42 of the elastomer film 14 assists in the injection of light from the prism into the film. Light from either a fluorescent or incandescent or a He—Ne laser can be focussed through the diagonal side of the prism 20 onto the elastomer film 14 and propagated across the film as shown by the arrows.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A visual display panel, comprising:
    a substrate of an electrically insulating material having a generally flat upper surface;
    a plurality of lower, parallel conducting lines deposited on said upper surface of said substrate;
    a transparent, deformable film of elastomer material on top of said lower conducting lines and said substrate;
    a plurality of upper, parallel conducting lines deposited on the upper surface of said deformable elastomer film, said conducting lines extending in a direction substantially perpendicular to said lower conducting lines;
    light source means for directing light into said deformable elastomer film near the edge portion thereof, said light being internally reflected within said elastomer film as it is propagated across the longitudinal length thereof;
    means for providing a voltage difference across selected pairs of said upper and lower conducting lines to produce a deformation of said elastomer film and light scattering at the locations where the excited upper and lower lines cross over one another;
    whereby said light is scattered at the location of said deformation and detected by an observer of the panel.

2. A visual display panel as recited in claim 1 wherein said deformable elastomer film has an index of refraction which is greater than the index of refraction of said substrate.

3. A visual display panel as recited in claim 2 wherein said deformable elastomer film has an index of refraction which is greater than air.

4. A visual display panel as recited in claim 1 wherein said deformable elastomer film has a thickness of about 1 to 20 mils.

5. A visual display panel as recited in claim 1 wherein said deformable elastomer film is comprised of a silicone material.

6. A visual display panel as recited in claim 1 wherein said substrate is comprised of a glass material.

7. A visual display panel as recited in claim 1 wherein said light source means includes a prism for coupling light from a source into said deformable elastomer film at angles which provide for internal reflection of the light within said elastomer film.

8. A visual display panel as recited in claim 7 wherein said prism is of a generally triangular shape, and light from a source is focused through the diagonal side of said prism onto said elastomer film.

9. A visual display panel as recited in claim 1 wherein said light source means are located near the edge portion of said deformable elastomer film around substantially the entire periphery of said film.

10. A visual display panel as recited in claim 1, wherein said lower conducting lines are adhered to said substrate such that there is no relative movement therebetween.

11. A visual display panel, comprising:
    a substrate of an electrically insulating material having a generally flat upper surface;
    a plurality of lower, spaced apart, electrodes located substantially across the upper surface of said substrate;
    a transparent, deformable film of elastomer material on top of said lower electrodes and said substrate;
    a plurality of upper, spaced apart, electrodes located on the upper surface of said deformable elastomer film, with at least a portion of each of said upper electrodes being located opposite to at least a portion of one of said lower electrodes;
    light source means for directing light into said deformable elastomer film near the edge portion thereof, said light being internally reflected within said elastomer film as it is propagated across the longitudinal length thereof;
    means for providing a voltage difference across selected, oppositely positioned pairs of said upper and lower electrodes to produce a deformation of said elastomer film and light scattering in the area of excitation;
    whereby said light is scattered at the location of said deformation and detected by an observer of the panel.

12. A visual display panel as recited in claim 11 wherein said light source means includes a prism for coupling light from a source into said deformable elastomer film at angles which provide for internal reflection of the light within said elastomer film.

13. A visual display panel as recited in claim 12 wherein said prism is of a generally triangular shape, and light from a source is focused through the diagonal side of said prism onto said elastomer film.

14. A visual display panel as recited in claim 11, wherein said deformable elastomer film has an index of refraction which is greater than the index of refraction of said substrate.

15. A visual display panel as recited in claim 11 wherein said deformable elastomer film has a thickness of about 1 to 20 mils.

16. A visual display panel as recited in claim 11 wherein said deformable elastomer film is comprised of a silicone material.

17. A visual display panel as recited in claim 11, wherein said substrate is comprised of a glass material.

18. A visual display panel, comprising:
    a substrate of an electrically insulating material having a generally flat upper surface;
    a plurality of lower, parallel conducting lines deposited on said upper surface of said substrate;
    a transparent, deformable film of elastomer material on top of said lower conducting lines and said substrate;
    an outer film of a transparent insulating material on top of said deformable elastomer film, said outer film having a refractive index which is less than the refractive index of said deformable elastomer film;
    a plurality of upper, parallel conducting lines deposited on the upper surface of said outer film of transparent insulating material, said conducting lines extending in a direction substantially perpendicular to said lower conducting lines;

light source means for directing light into said deformable elastomer film near the edge portion thereof, said light being internally reflected within said elastomer film as it is propagated longitudinally across the length thereof;

means for providing a voltage difference across selected pairs of said upper and lower conducting lines to produce a deformation of said elastomer film at the locations where the excited upper and lower lines cross over one another;

whereby said light is scattered at the location of said deformation and detected by an observer of the panel.

* * * * *